United States Patent
Kondo et al.

[11] Patent Number: 5,949,978
[45] Date of Patent: Sep. 7, 1999

[54] DATA COMMUNICATION APPARATUS AND METHOD CAPABLE OF SELECTING A COMMUNICATION DATABASE IN ACCORDANCE WITH AN ATTRIBUTE OF A DESTINATION

[75] Inventors: Masaya Kondo, Yokohama; Koichi Matsumoto, Tokyo; Kazutaka Matsueda, Yokohama; Soichi Yamamuro, Tokyo; Fumio Shoji; Masaru Saruwatari, both of Kawasaki, all of Japan

[73] Assignee: Canon Kabushiki Kaisha, Tokyo, Japan

[21] Appl. No.: 08/723,521

[22] Filed: Sep. 30, 1996

[30] Foreign Application Priority Data

Oct. 4, 1995 [JP] Japan ................................. 7-257773

[51] Int. Cl.$^6$ ................................. G06F 15/16
[52] U.S. Cl. ............... 395/200.61; 358/400; 395/200.58; 707/1; 707/10
[58] Field of Search ................ 358/402, 256, 358/400; 395/200.58, 181, 183.01, 183.15, 200.14, 200.17, 200.61; 370/338, 349; 707/1, 10; 709/231, 228; 714/39

[56] References Cited

U.S. PATENT DOCUMENTS

| | | | |
|---|---|---|---|
| 4,058,838 | 11/1977 | Crager et al. | 358/256 |
| 5,521,719 | 5/1996 | Yamada | 358/402 |
| 5,644,404 | 7/1997 | Hashimoto et al. | 358/402 |

*Primary Examiner*—Dung C. Dinh
*Assistant Examiner*—Chuong Ho
*Attorney, Agent, or Firm*—Morgan & Finnegan, LLP

[57] ABSTRACT

When data is to be sent from a communication apparatus connected to a local area network (LAN) to a destination communication apparatus via a communication line, communication parameters related to the destination communication apparatus are inquired to a predetermined terminal apparatus upon reception of a transmission request from a terminal apparatus connected to the LAN. Communication control of the data is performed in accordance with the transmission request based on the communication parameters obtained by the inquiry. Also transmission control of the data is performed in accordance with a communication mode decided based upon the result of an interpretation of reception capability of the destination communication apparatus.

19 Claims, 5 Drawing Sheets

FIG. 5

LIST OF DESTINATION ID

| DESTINATION ID | DESTINATION IN ABBREVIATED FORM | COMMUNICATION MANAGEMENT SERVER | BILLING MANAGEMENT SERVER | NOTE |
|---|---|---|---|---|
| 0001 | A BRANCH | WS-1 | SERVER | |
| 0002 | B BRANCH | WS-1 | SERVER | DOMESTIC OFFICE |
| 0003 | C BRANCH | WS-1 | SERVER | |
| 1001 | D BRANCH | WS-2 | SERVER | |
| 1001 | E BRANCH | WS-2 | SERVER | OVERSEAS OFFICE |
| 9001 | JOHN | WS-3 | WS-3 | |
| 9015 | JIMMY | WS-3 | WS-3 | INDIVIDUAL |

DATA COMMUNICATION APPARATUS AND METHOD CAPABLE OF SELECTING A COMMUNICATION DATABASE IN ACCORDANCE WITH AN ATTRIBUTE OF A DESTINATION

BACKGROUND OF THE INVENTION

Present invention relates to data communication apparatus connectable to a Local Area Network (LAN) and data communication method.

Conventionally, in a facsimile apparatus connectable to LAN, communication parameters such as a destination telephone number and the like are stored in a communication database managed by an application called, e.g. "a telephone directory" or the like, installed in a predetermined terminal apparatus, and communication control is performed based on the database. However, control operation, such as managing of reception capability of the destination is not conventionally performed by the terminal apparatus connected to the LAN.

Similar to the conventional facsimile apparatus, if communication parameters such as a destination telephone number and the like are controlled based on the communication database of a predetermined terminal apparatus, a problem arises in that selection of the communication database suitable for the purpose or attribute of the destination cannot be done.

Further in the conventional facsimile apparatus, since reception capability of the destination cannot be managed by a terminal apparatus connected to the LAN, there is a problem in that communication in a most suitable reception mode (e.g. Group III or Group IV) cannot be performed, and transmission control for an appropriate image size (corresponding to reduction control of a transmitting image at a facsimile apparatus on the LAN) cannot be performed.

SUMMARY OF THE INVENTION

The present invention has been made in consideration of the above situation, and has as its object to provide a facsimile apparatus capable of selecting a communication database in accordance with the purpose or attribute of a destination including reception capability.

In order to attain the above object, the present invention provides a data communication apparatus connected to a local area network (LAN) for transmitting data to a destination communication apparatus via a communication line, comprising: reception means for receiving a transmission request from a first terminal apparatus connected to the LAN; inquiry means for inquiring for communication parameters related to the destination communication apparatus, to a predetermined second terminal apparatus connected to the LAN; and control means for performing communication control of the data in accordance with the transmission request utilizing the communication parameters obtained by said inquiry means.

Further, in order to attain the above object, the present invention provides a data communication apparatus connected to a local area network (LAN) for transmitting data to a destination communication apparatus via a communication line, comprising: request means for requesting transmission of predetermined parameters to a specified terminal apparatus on the LAN; interpret means for interpreting reception capability of the destination communication apparatus in accordance with the parameters; decision means for determining a communication mode based on the reception capability; and control means for performing transmission control of the data in accordance with the communication mode, wherein the interpretation of the reception capability is executed when the data transmission control begins.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a table showing general view of a list of ID (identification) of destinations managed in the LAN-FAX.

DETAILED DESCRIPTION OF THE PREFERRED EMBODIMENT

Preferred embodiment of the present invention will be described in detail in accordance with the accompanying drawings.

Figure 1:
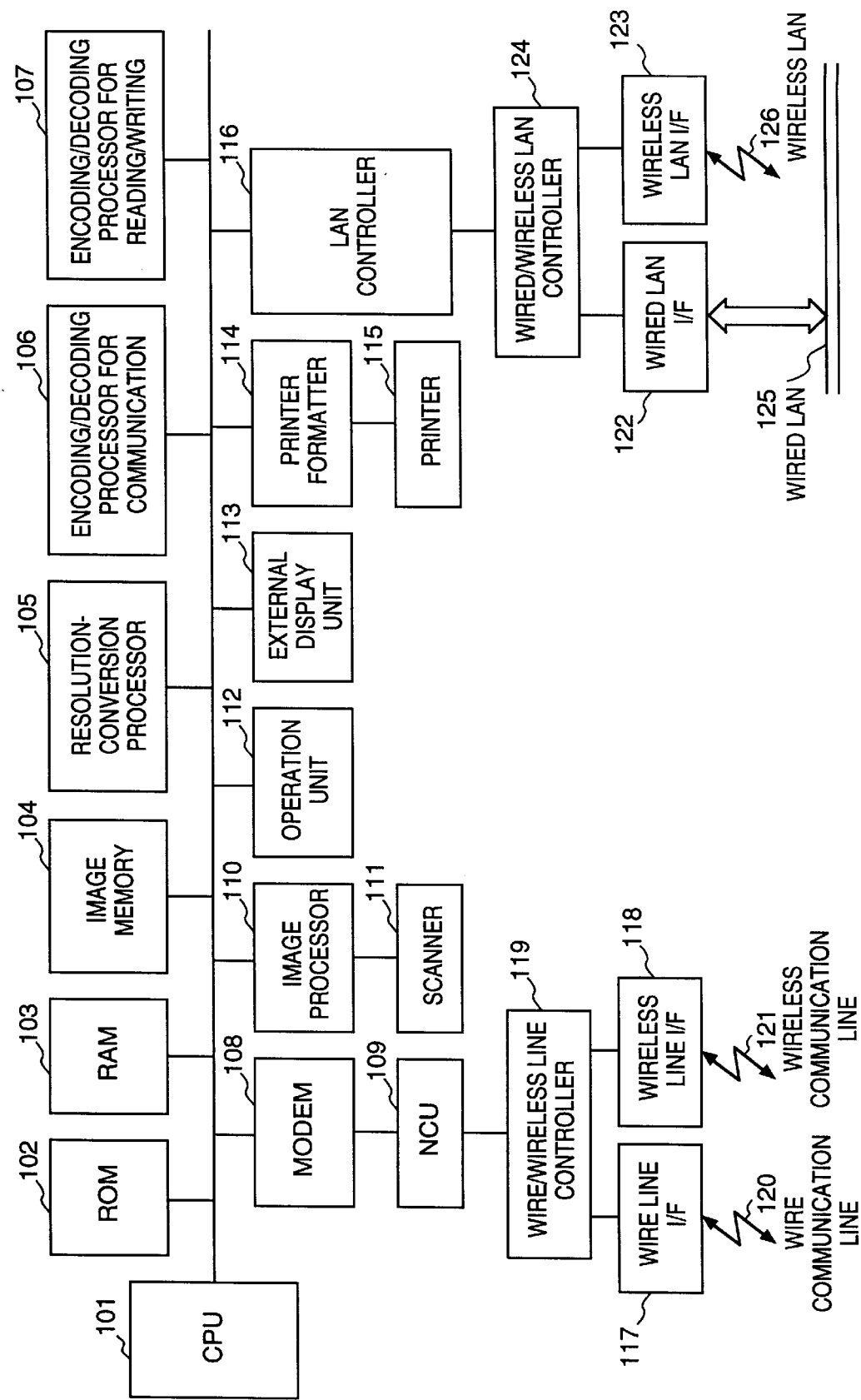
FIG. 1 is a block diagram showing a structure of a facsimile apparatus according to a present embodiment.

FIG. 1 is a block diagram showing the configuration of a facsimile apparatus according to an embodiment of the present invention. In FIG. 1, a CPU 101 is a system controller which controls the entire facsimile apparatus. A ROM 102 is a memory for storing control programs for the CPU 101. A RAM 103 comprises e.g. an SRAM for storing program-control variables and the like. The RAM 103 also serves as a buffer RAM which provides a work area for storing various data such as set-values registered by an operator or apparatus management data and the like. An image memory 104 comprises e.g. a DRAM for storing image data.

A resolution-conversion processor 105 performs resolution conversion control such as millimeter to inch conversion of raster data. An encoding/decoding processor (for communication) 106 performs coding for communication when the coding method used for reading or writing differs from that used for communication. An encoding/decoding processor (for reading/writing) 107 performs coding and decoding of image data for reading or writing. A MODEM 108 performs modulation on a facsimile reception signal.

An NCU (Network Control Unit) 109 transmits a communication-destination selection signal (dial pulse or multi-frequency tone signal) onto a wire communication line 120 via a wire line I/F (interface) 117, or onto a wireless communication link 121 via a wireless link I/F 118. The NCU 109 also performs automatic incoming-call terminating operation by detecting a call signal from the wire communication line 120 or the wireless communication link 121. Note that a wire/wireless line controller 119 controls the wire line I/F 117 and wireless link I/F 118.

A scanner 111 comprises, e.g., a contact image sensor, an original document feeding mechanism and the like for optically reading an image of the original document and converting the read image into electrical image data. An image processor 110 performs correction operation on the image data read by the scanner 111, and outputs image data with high precision. An operation unit 112 comprises a keyboard (not shown) and the like for an operator to perform various input operation. An external display unit 113 displays predetermined information for notifying a user, with utilizing an LCD, an LED or the like.

Upon print out of file data from a workstation or the like, a printer formatter 114 interprets a printer description language, and converts the code data into image data. A printer 115 printouts a received image or file data on a print sheet. A wired LAN I/F 122 connects the facsimile apparatus to a wired LAN 125, while a wireless LAN I/F 123 connects the facsimile apparatus to a wireless LAN 126. These wired LAN I/F 122 and the wireless LAN I/F 123 are controlled by a wired/wireless LAN controller 124. A LAN controller 116 processes data for data transmission/reception with a server (not shown) or a terminal on the wired LAN 125 or wireless LAN 126.

Figure 2:
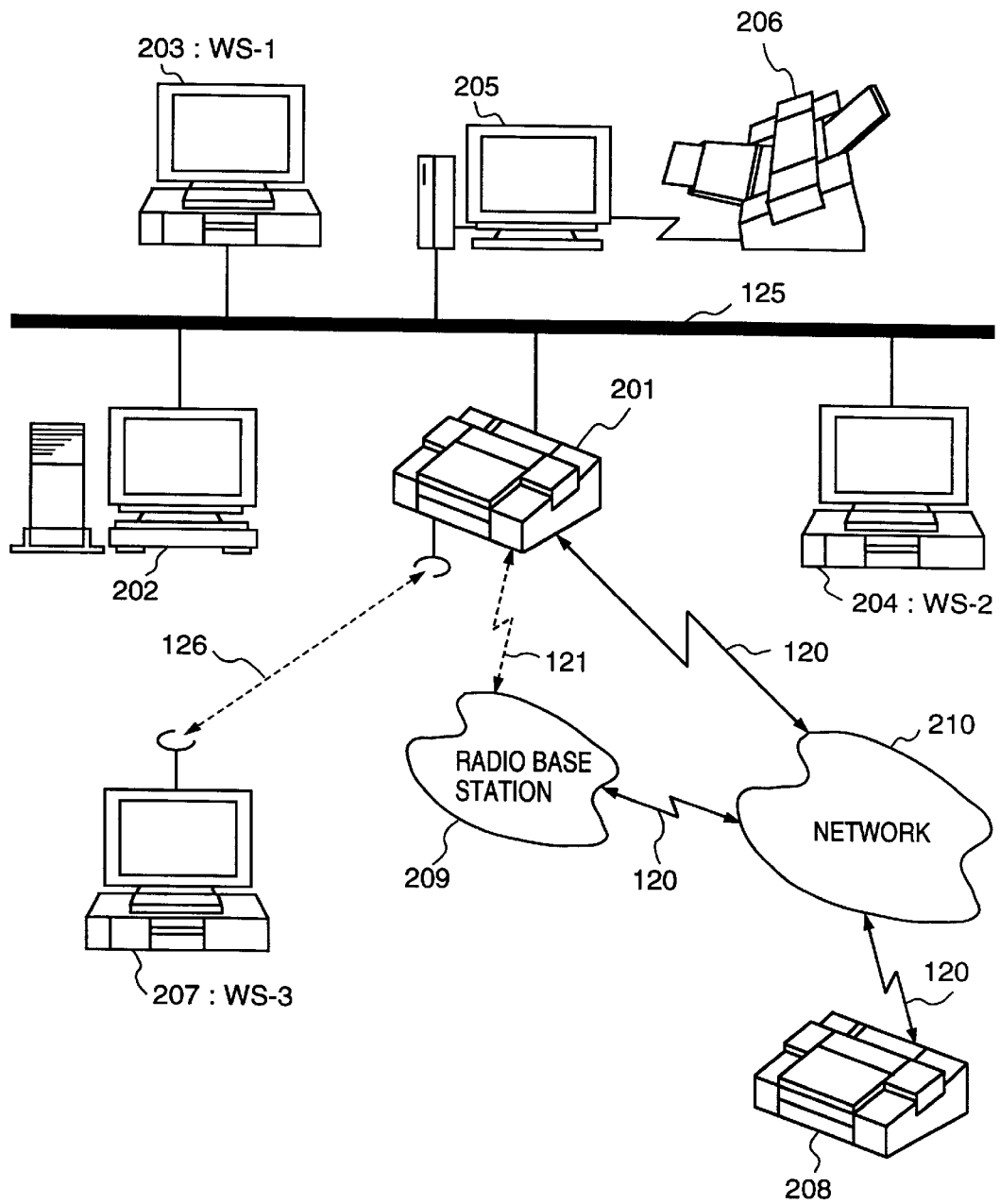
FIG. 2 is a diagram of a system configuration including the facsimile apparatus according to the present embodiment.

FIG. 2 is a diagram of a system configuration including the facsimile apparatus of the embodiment shown in FIG. 1. In FIG. 2, reference numeral 201 denotes the facsimile apparatus in FIG. 1 which can be directly connected to the wired LAN 125 and the wireless LAN 126; 202, a server machine for a LAN to which the facsimile apparatus 201 is connected, which manages the LAN and files on the LAN; and 203 and 204, client machines WS-1 and WS-2 (information processing terminals) connected to the wired LAN 125.

Reference numeral 205 denotes a printer server which receives a printing request from the client machines 203 and 204 and outputs image data to a printer 206. The printer 206 printouts the image data sent from the printer server 205.

Reference numeral 207 denotes a client machine WS-connected to the wireless LAN 126; 208, a receiving-side facsimile apparatus which performs communication with the facsimile apparatus 201 via a telephone line; and 209, a radio base station. The facsimile apparatus 201 communicates with the facsimile apparatus 208 via the wireless communication link 121.

Reference numeral 210 denotes a network to which the facsimile apparatus 208 and the radio base station 209 are connected via the wire communication line 120. The wireless LAN 126 is constituted by facsimile apparatuses and client machines that have wireless LAN interfaces. The wireless link 121 connects the facsimile apparatus 201 with the radio base station 209 via wireless link interfaces.

Descriptions will be provided for transmission control in the facsimile apparatus according to the present embodiment. When the information processing terminal 203 logs into the server machine 202 and sends a transmission request to the facsimile apparatus 201, the facsimile apparatus 201 begins transmission control in response to the transmission request from the server 202, performs transmission operation, inquires for parameters necessary for the transmission to the information processing terminal 204 where communication parameters such as a telephone number or the like are managed, and notifies the transmission result to the server 202.

Figure 3:
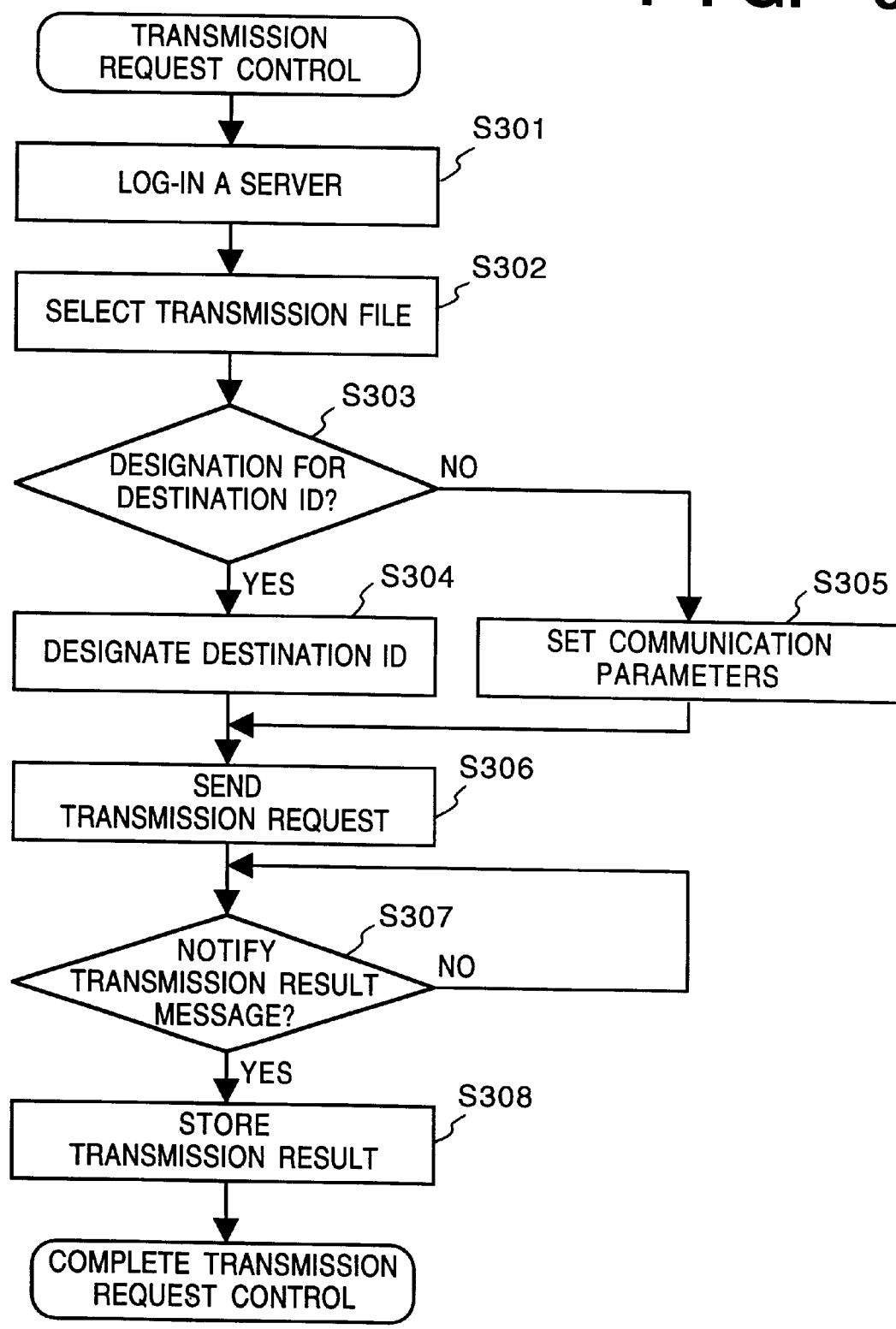
FIG. 3 is a flowchart showing control operation of a transmission request in an information processing terminal according to the present embodiment.

FIG. 3 is a flowchart showing control operation of transmission request in the information processing terminal 203 according to the present embodiment. As shown in FIG. 3, the information processing terminal 203 first selects the server machine 202 for logging in (step S301). Next, an application software is started for performing transmission control on the server 202. The application is set in advance in the server 202.

After the application is started, the information processing terminal 203 selects a transmission file (step S302) and designates the communication parameters of the destination. In the present embodiment, selection for either utilizing communication parameters registered in the information processing terminal 204 or directly setting communication parameters by the terminal 203, is possible. Therefore in step S303, determination is made for whether or not it is necessary to designate an ID (identification) of the destination.

When utilizing communication parameters managed solely by the information processing terminal 204, a predetermined ID of the destination which is necessary for the facsimile apparatus 201 to obtain communication parameters, is designated (step S304). If an ID of the destination is not designated, the information processing terminal 203 sets the necessary communication parameters e.g. the destination telephone number (step S305).

After setting the communication parameters and the like as described above, a transmission request is sent from the server 202 to the facsimile apparatus 201 (step S306). After sending the transmission request, the information processing terminal awaits a transmission result message from the facsimile apparatus 201. When the result message is received, the result of transmission is registered in a communication history file managed by the server 202, thereby ending the transmission request control.

Figure 4:
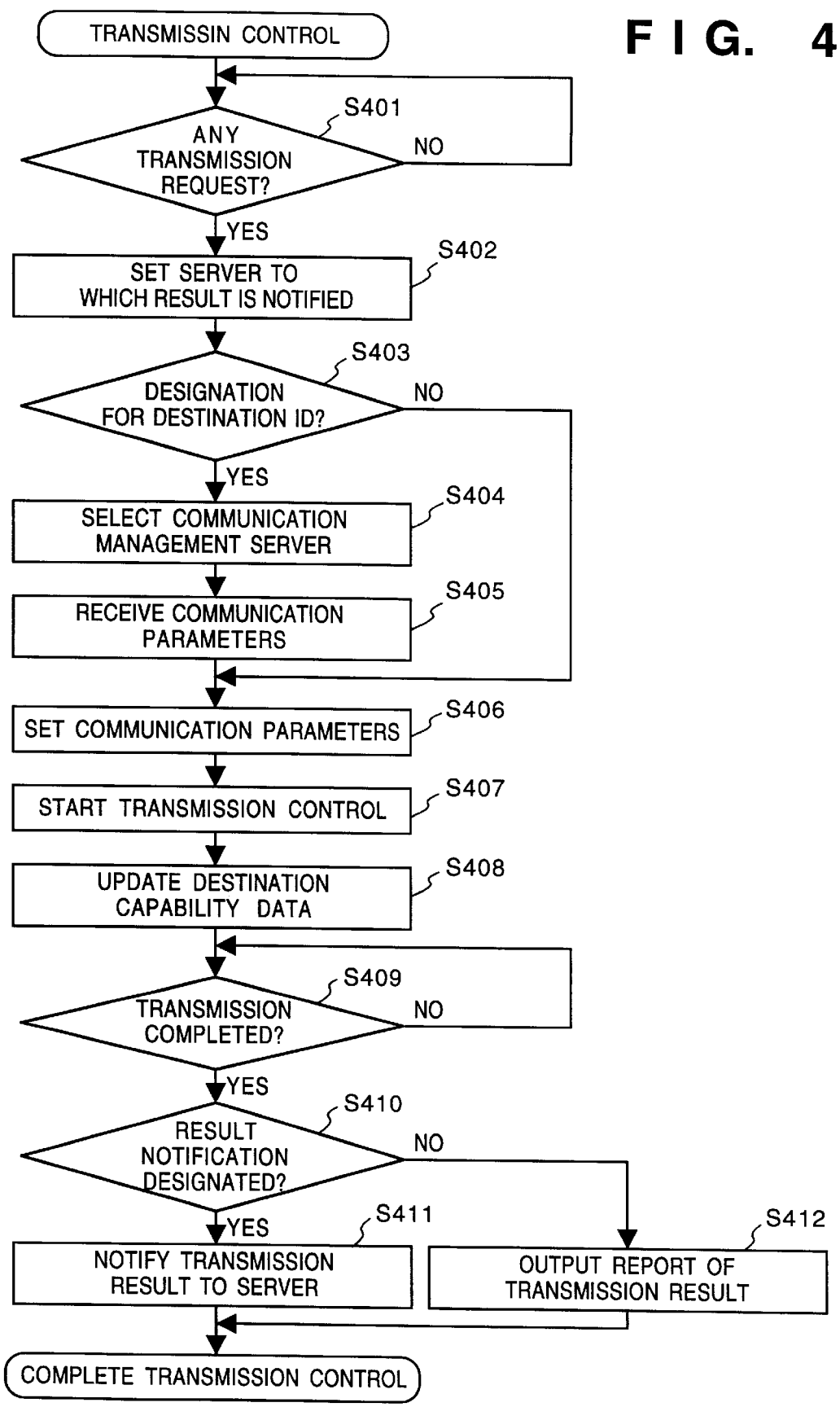
FIG. 4 is a flowchart showing control operation of transmission in a LAN-FAX according to the present embodiment.

FIG. 4 is a flowchart showing control operation of transmission in the facsimile apparatus according to the present embodiment. As shown in FIG. 4, the apparatus initially observes whether or not there is a transmission request from the server 202 (step S401). Herein, a request for transmission is initialized upon reception of a transmission-request command from the server 202. The transmission-request command includes communication parameters e.g. a destiantion ID of the transmission destination and the like, transmission file data, a destination address of the server 202 to which the transmission result is notified.

By designating a server to which the transmission result is to be notified, using the transmission-request command, it is possible to notify communication management information, e.g., a transmission result, billing information and the like, to an arbitrary terminal apparatus connected to the LAN.

Upon reception of a transmission-request command in the foregoing manner, the command is interpreted and a terminal apparatus is set, to which the communication management information e.g. a transmission result and the like is notified (step S402). Note that in the present embodiment, if the transmission-request command does not include a designation of a terminal apparatus to which the transmission result is notified, the communication management information is notified to a terminal apparatus which is set in the facsimile apparatus 201 in advance or to the server.

As a result of the aforementioned interpretation of the command, if a destination ID is designated to that command (YES is rendered in step S403), a communication management server (herein, the information processing terminal 204) which manages the communication parameters of the designated destination, is selected (step S404).

The selection of the communication management server is performed by searching a list of destination ID's shown in FIG. 5, which is managed in the facsimile apparatus. The list includes destination ID's, names of the destinations, communication management servers, and the like. By designating a destination ID, a destination can be designated to which communication parameters are to be inquired. In the case where a name of the destination in abbreviated form is designated as a communication parameter by the transmission-request command, it is capable of performing a control similar to the case where ID of the destination is designated.

After performing the selection of the communication management server in step S404, a request for communication-parameters is sent to the selected communication management server. The apparatus then receives communication parameters corresponding to the destination ID from the communication management server, and interprets the communication parameters (step S405). The communication parameters comprise transmission data e.g. a destination telephone number, reception capability data for the destination e.g. a communication mode, and the like. The reception capability data of the destination is data indicating, for example, communication capability in G4 mode or an image size capable of being received at the destination. Notification of such information in advance enables transmission control in a most appropriate communication mode. By setting the communication parameters interpreted in the foregoing manner (step S406), the transmission control is started (step S407).

Note that if it is determined in step S403 that a destination ID is not designated, the communication parameters designated by the above transmission-request command are set. If the reception capability data of the destination cannot be obtained, a default value predeterminedly set in the facsimile apparatus 201 is utilized.

After the transmission control to the destination is started the reception capability of the destination is interpreted, and the capability data of the destination is updated if necessary (step S408). The update of the capability data of the destination is performed only when this capability data differs from capability data managed by the communication management server, as a result of the interpretation of the reception capability of the destination. Then, completion of the transmission according to the transmission control is observed (step S409). Upon completion of the transmission, it is determined in step S410 that whether or not notification of result is designated. If there is the designation, transmission result, billing information and the like, are notified to a predetermined server (step S411), thereby accomplishing the transmission control.

Note that in the case where the reception capability data is updated in the above step S408, the reception capability data updated is notified to the communication management server in step S411.

Meanwhile, if it is determined in step S410 that there is no designation to the notification of result, a transmission-result report is outputted in step S412 and the transmission control ends.

By performing selection control of a management terminal on the LAN where communication parameters of the designated destination are stored as set forth above, it is possible to select a communication database suitable for the purpose or attribute of the destination, and accordingly, it is possible to manage communication parameters by plural servers depending on the purpose.

Moreover, upon starting of transmission control by notifying the reception capability of the destination to a terminal which manages the communication database, it is possible to determine reception capability of the destination before a transmission request is sent to the facsimile apparatus on the LAN, thereby enabling communication in a most suitable communication mode or transmission control of an image in an appropriate size.

Note that in the foregoing embodiment, selection of a communication management server is performed by searching the list of destination ID's which is managed by the facsimile apparatus. However the present invention is not limited to this method. For instance, the list may be managed by a predetermined terminal apparatus on the LAN, to which an inquiry of a communication management server is addressed. In such case, it is also possible to search a communication management server according to, for instance, abbreviated name of the destination, instead of a destination ID.

In the above embodiment, a search for the communication management server is performed utilizing the destination ID, in order to set communication parameters, however, the present invention is not limited to this method. For example, data such as a destination ID and the like may be sent to all terminal apparatuses connected to the LAN, thus obtaining communication parameters from a terminal apparatus which manages the communication parameters corresponding to the destination ID.

The updating control of the reception capability data of the destination is performed during transmission in the above embodiment, in accordance with a predetermined interpretation result. The data may be inquired by the communication management server to the facsimile apparatus, if necessary. Furthermore, as for a server, the communication management server which manages communication parameters and the server which manages billing information and the like need not be assigned to the same server. For example, the billing information may be entirely managed by a specified server.

The present invention can be applied to a system constituted by a plurality of devices such as a host computer, an interface or a printer, or to an apparatus comprising a single device. Furthermore, the invention is applicable also to a case where the invention is embodied by supplying a program to a system or apparatus. In this case, a storage medium, storing a program according to the invention constitutes the invention. The system or apparatus installed with the program read from the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. Data communication apparatus connected to a local area network (LAN) for transmitting data to a destination communication apparatus via a communication line, comprising:

reception means for receiving a transmission request from a first terminal apparatus connected to the LAN;

determination means for determining whether or not a predetermined identifier is included in the transmission request received by said reception means;

inquiry means for inquiring for communication parameters related to the destination communication apparatus, to a predetermined second terminal apparatus connected to the LAN; and control means for performing communication control of the data in accordance with the transmission request, wherein if it is determined by said determination means that the predetermined identifier is included in the received data, said control means performs communication control based on the communication parameters obtained by said inquiry means, while if it is determined by said determination means that the predetermined identifier is not included in the received data, said control means performs communication control based on communication parameters included in the transmission request received by said reception means.

2. The data communication apparatus according to claim 1, wherein said second terminal apparatus is a communication management server which entirely manages the communication parameters, and wherein said control means inquires upon reception of the transmission request, for communication parameters to the communication management server corresponding to the destination communication apparatus and begins the communication control.

3. The data communication apparatus according to claim 1, further comprising register means for registering a transmission result obtained in response to the transmission request in the second terminal apparatus, as a communication history.

4. The data communication apparatus according to claim 1, further comprising register means for registering a transmission result obtained in response to the transmission request in the predetermined terminal apparatus connected to the LAN, as a communication history.

5. The data communication apparatus according to claim 1, wherein said LAN is a wired LAN.

6. The data communication apparatus according to claim 1, wherein said LAN is a wireless LAN.

7. Data communication apparatus connected to a local area network (LAN) for transmitting data to a destination communication apparatus via a communication line, comprising:

request means for requesting transmission of predetermined parameters to a specified terminal apparatus on the LAN;

interpret means for interpreting reception capability of the destination communication apparatus in accordance with the parameters;

decision means for determining a communication mode based on the reception capability;

control means for performing transmission control of the data in accordance with the communication mode;

determination means for determining whether or not the reception capability, interpreted by said interpret means, has been changed based on the transmission control performed by said control means; and notification means for notifying the specified terminal that the reception capability has been changed, if it is determined that the reception capability has been changed by said determination means.

8. The data communication apparatus according to claim 7, wherein the interpretation of the reception capability is executed upon beginning of the transmission control, if reception capability of the destination communication apparatus which is predeterminedly managed, is different from the reception capability obtained by said interpretation at the time of controlling the transmission.

9. The data communication apparatus according to claim 7, wherein the parameters are stored in a specified terminal apparatus on the LAN, in a form of a list where said parameters correspond to an ID (identification) and a name in abbreviated form of the destination communication apparatus.

10. The data communication apparatus according to claim 7, wherein said data is image data and said control means performs data conversion of the image data in accordance with the reception capability.

11. The data communication apparatus according to claim 10, wherein the destination communication apparatus is a facsimile apparatus and said control means converts an image size of the image data in accordance with the reception capability of the facsimile apparatus in G3 or G4 mode.

12. The data communication apparatus according to claim 7, further comprising register means for registering a transmission result obtained in response to the transmission request in the predetermined terminal apparatus connected to the LAN, as a communication history.

13. The data communication apparatus according to claim 7, further comprising notifying means for notifying the predetermined parameters to all terminal apparatuses connected to the LAN.

14. The data communication apparatus according to claim 7, wherein the LAN is a wired LAN.

15. The data communication apparatus according to claim 7, wherein the LAN is a wireless LAN.

16. Data communication method for transmitting data from a data communication apparatus connected to a local area network (LAN) to a destination communication apparatus via a communication line, comprising the steps of:

receiving a transmission request from a first terminal apparatus connected to the LAN;

determining whether or not a predetermined identifier is included in the transmission request received in said receiving step;

inquiring for communication parameters related to the destination communication apparatus to a predetermined second terminal apparatus connected to the LAN; and performing communication control of the data in accordance with the transmission request, wherein if it is determined in said determining step that the predetermined identifier is included in the received data, communication control is performed in said performing step based on the communication parameters obtained in said inquiring step, while if it is determined in said determining step that the predetermined identifier is not included in the received data, communication control is performed in said performing step based on communication parameters included in the transmission request received in said receiving step.

17. Data communication method for transmitting data from a data communication apparatus connected to a local area network (LAN) to a destination communication apparatus via a communication line, comprising the steps of:

requesting transmission of predetermined parameters to a specified terminal apparatus on the LAN;

interpreting reception capability of the destination communication apparatus in accordance with the parameters;

determining a communication mode based on the reception capability;

performing transmission control of the data in accordance with the communication mode;

determining whether or not the reception capability, interpreted in said interpreting step, has been changed based on the transmission control performed in said performing step; and notifying the specified terminal that the reception capability has been changed, if it is determined that the reception capability has been changed in said determining step.

18. A computer readable medium for storing a computer program to make a computer transmit data to a destination communication apparatus connected with a local area network (LAN), said program comprising the steps of:

receiving a transmission request from a first terminal apparatus connected to the LAN;

determining whether or not a predetermined identifier is included in the transmission request received in said receiving step;

inquiring for communication parameters related to the destination communication apparatus to a predetermined second terminal apparatus connected to the LAN; and performing communication control of the data in accordance with the transmission request, wherein if it is determined in said determining step that the predetermined identifier is included in the received data, communication control is performed in said performing step based on the communication parameters obtained in said inquiring step, while if it is determined in said determining step that the predetermined identifier is not included in the received data, communication control is performed in said performing step based on communication parameters included in the transmission request received in said receiving step.

19. A computer readable medium for storing a computer program to make a computer transmit data to a destination communication apparatus connected with a local area network (LAN), said program comprising the steps of:

requesting transmission of predetermined parameters to a specified terminal apparatus on the LAN;

interpreting reception capability of the destination communication apparatus in accordance with the parameters;

determining a communication mode based on the reception capability;

performing transmission control of the data in accordance with the communication mode;

determining whether or not the reception capability, interpreted in said interpreting step, has been changed based on the transmission control performed in said performing step; and notifying the specified terminal that the reception capability has been changed, if it is determined that the reception capability has been changed in said determining step.

* * * * *

UNITED STATES PATENT AND TRADEMARK OFFICE
CERTIFICATE OF CORRECTION

PATENT NO. : 5,949,978
DATED : September 7, 1999
INVENTOR(S) : Kondo et al.

It is certified that error appears in the above-identified patent and that said Letters Patent is hereby corrected as shown below:

Column 3, line 39, delete "WS-connected" and insert therefor -- WS-3 connected --.

Signed and Sealed this

Twenty-seventh Day of March, 2001

Attest:

NICHOLAS P. GODICI

Attesting Officer

Acting Director of the United States Patent and Trademark Office